UNITED STATES PATENT OFFICE.

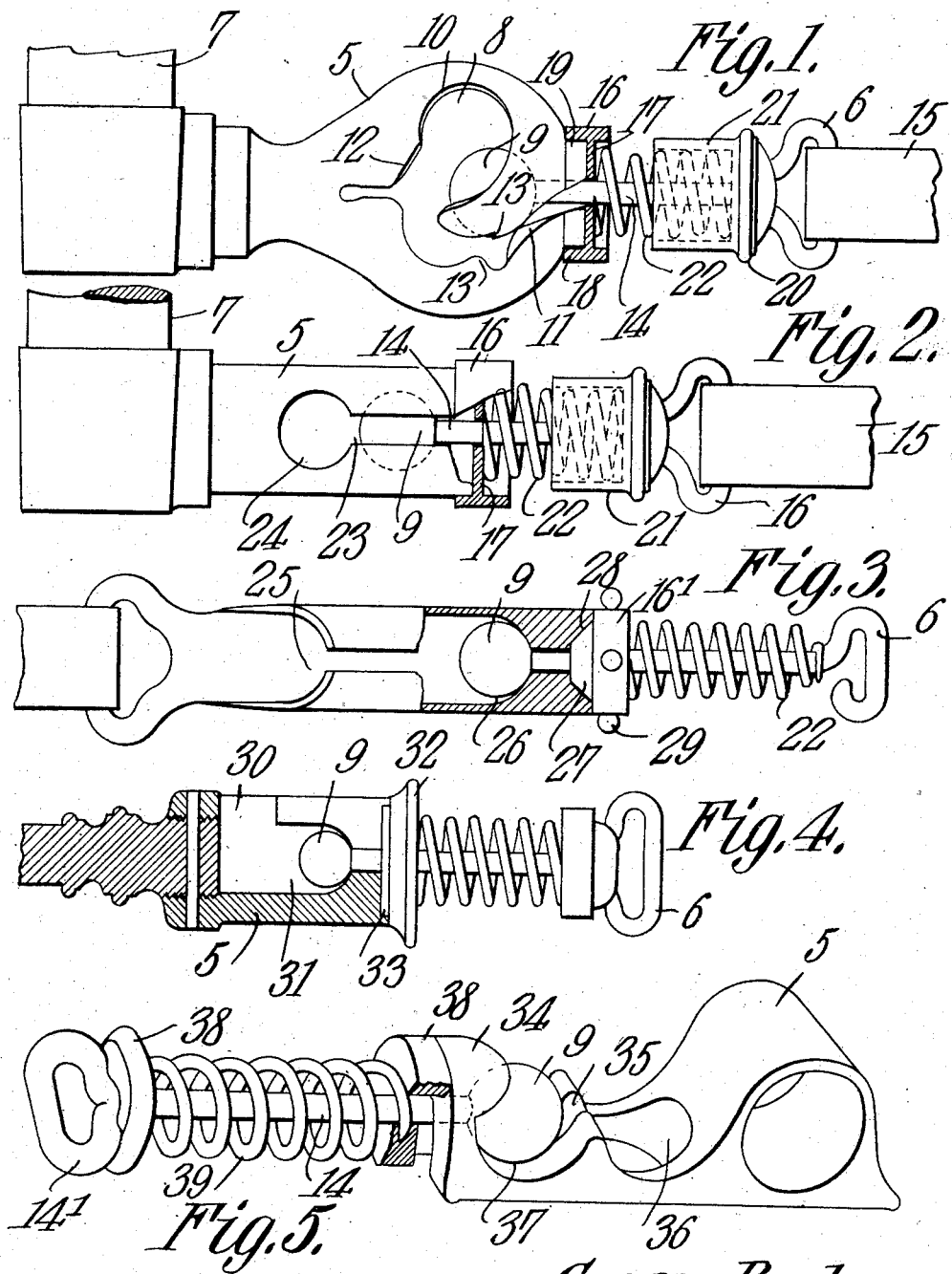

GEORGE BACH, OF LYNDON STATION, WISCONSIN.

COUPLING.

No. 865,153.        Specification of Letters Patent.        Patented Sept. 3, 1907.

Application filed April 11, 1906. Serial No. 311,164.

*To all whom it may concern:*

Be it known that I, GEORGE BACH, a citizen of the United States, residing at Lyndon Station, in the county of Juneau and State of Wisconsin, have invented a new and useful Coupling, of which the following is a specification.

This invention relates to couplings for harness, tug chains, traces, whiffletrees, cables and the like and has for its object to provide improved means for effecting the union between two or more desired parts.

A further object is to provide means for locking the mating members in coupled or operative position and means for exerting a yieldable pressure on the locking members in the direction of the length of the coupling.
A still further object of the invention is to generally improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a top plan view of a coupling constructed in accordance with my invention. Fig. 2 is a similar view illustrating a modified form of the invention. Fig. 3 is a top plan view partly in section illustrating another modification. Fig. 4 is a side elevation partly in section illustrating a further modification. Fig. 5 is a perspective view illustrating a still further modification.

Similar numerals of reference indicate corresponding parts in all of the figures of the drawings.
The coupling shown in Fig. 1 of the drawings comprises a pair of mating members 5 and 6, the member 5 being provided with means for attachment to a swingletree or other suitable support 7 and having its enlarged head formed with a socket 8 for the reception of the spherical head 9 of the member 6.

The wall of the socket 8 is formed with an aperture 10 through which the head of the member 6 is introduced into the socket 8, said aperture having a contracted portion or slot 11 inclined to the longitudinal axis of the coupling and opening through the free end of the member 5 for guiding the shank 14 of the member 6 to the mouth of the socket, as shown.

The wall of the aperture 10 is formed with a depression or cut away portion 12 to facilitate positioning of the head 9 within the socket while the walls of the contracted portion 11 are provided with inwardly extending lugs or projections 13 which serve to partially close the contracted portion 11 and thus prevent accidental displacement of the shank.
The shank 14 terminates in a loop for attachment to a trace or other flexible connection 15 and slidably mounted on said shank is a sleeve or collar 16 which constitutes a movable spring engaging head and is provided with a perforated diaphragm 17 for the reception of the shank. The collar or head 16 is formed with an annular flange 18 adapted to engage an annular extension or flange 19 on the free end of the member 5 thereby locking the head within the socket and maintaining the coupling members in alinement with each other.

Secured to the shank 14 and spaced from the collar 16 is a stationary spring engaging head 20 provided with an annular extension 21 in which is seated one end of a coiled spring 22 the opposite end of said spring bearing against the diaphragm 17 and serving to yieldably support the collar or head 16 in engagement with the reduced end of the mating member 5.

In coupling the members the shank carrying the spherical head is placed at right angles to the longitudinal axis of the member 5 and the head introduced through the aperture 10 in the socket 8, after which the shank is moved longitudinally of the member through the contracted portion 11 and thence pressed downwardly until said shank is in alinement with the longitudinal axis of the member 5, the member 16 being previously retracted to permit the passage of the shank.

When the members 5 and 6 are coupled in the manner described the spring 22 will exert a longitudinal pressure on the locking collar or head 16 and move the latter longitudinally of the shank 14 into engagement with the flange 19 thereby effectually locking the parts and preventing lateral movement of the shank 14.

To release the coupling it is merely necessary to retract the collar or head 16 against the tension of the spring 22 and then press upwardly on the shank 14 when the latter may be guided through the contracted opening 11 to the aperture 10, in which position the shank will be disposed at right angles to the longitudinal axis of the member 5 so that the spherical head 9 may be lifted out of the socket.

It will thus be seen that the head 9 is yieldably supported in engagement with the interior wall of the socket 8 thereby forming a good connection between the same. It will also be observed that by exerting a rearward pressure on the collar or head 16 and manipulating the member 6 the parts may be readily detached.

In Fig. 2 of the drawing there is illustrated a modified form of the invention in which the member 5 is preferably tubular in shape and provided with a longitudinally disposed opening 23 which communicates with the head receiving socket 24, as shown, the parts being otherwise similar in construction to the coupling shown in Fig. 1 of the drawing.

In coupling the member shown in Fig. 2 the shank is placed at right angles to the longitudinal plane of the member 5 and the head 9 inserted in the socket 24 after which the collar or head 16 is retracted and the shank pressed downwardly within the opening 22 and the collar released thus locking the members in engagement with each other.

In Fig. 3 the mating member 5 is formed with a longitudinal bore 25 the end of which terminates short of the adjacent end of said member to form a socket 26 for the reception of the head 9 of the member 6. In this form of the device the locking collar or head 16′ is formed with a conical extension 27 adapted to engage a correspondingly shaped recess 28 formed in the adjacent end of the member 5, said collar being provided with radial finger pieces 29 to assist in moving said collar to inoperative position against the tension of the coiled spring when releasing the mating members.

In connecting the mating members shown in Fig. 5 the head is inserted in one end of the bore 25 with the shank disposed at right angles to and positioned within the slot in the member 5 and said shank moved longitudinally of the member 5 until the head bears against the curved wall of the socket 26 after which the head or collar 16′ is retracted and the shank pressed downwardly within the slot. The collar is then released thus causing the spring 22 to force the same in engagement with the recess 28, as shown.

In Fig. 4 the mating member 5 is preferably cylindrical in form and pierced by a transverse opening 30 which communicates with the longitudinal bore 31 for the reception of the spherical head 9, the mating member 6 being provided with a locking head or collar 32 having an annular flange or extension 33 adapted to engage a correspondingly shaped recess in the free end of the member 5. In this form of the device the members 5 and 6 are coupled by placing the head and shank at right angles to the longitudinal axis of the member 5 and inserting the head in the opening 30 in the manner before stated, after which the head or collar 33 is retracted and the shank pressed downwardly within the slot or bore 31.

A further modification is shown in Fig. 5 of the drawings in which the mating member 5 is provided with an over-hanging head 34 which forms one wall of the head receiving socket, said member being provided with a longitudinal slot or recess 35 which communicates with an opening 36 extending transversely through the member 5 and through which the spherical head 9 is introduced into the socket 37. In this form of the device the shank 14 is provided with spaced disks 38 between which is interposed a coiled spring 39 for yieldably supporting the head 9 in engagement with the wall of the socket.

In assembling the coupling shown in Fig. 5 of the drawing the shank carrying the spherical head 9 is placed at right angles to the longitudinal axis of the member 5 and said head inserted upwardly through the opening 36 until the adjacent portion of the shank registers with the slot 35, after which the shank is moved laterally within the slot and the head pressed downwardly in the socket 37. The forward disk 38 is then retracted and the looped end 14′ of the shank forced upwardly thus causing the shank to assume the horizontal position shown in Fig. 5 and in which position it will be retained by the disk 38 and spring 39.

The coupling shown in the different figures of the drawing may be made in different sizes and shapes and plated, japanned or otherwise coated to protect the same against the action of the elements.

While the improved coupling is particularly designed for connecting different portions of harness it is obvious that the same may be used with equally good results wherever a device of this character is found desirable.

Having thus described the invention what is claimed is:

1. A coupling comprising mating members normally extending in the same longitudinal plane, one of said members being provided with a socket and the other with a spherical head adapted to enter the socket, spaced heads carried by one of said members, and a spring interposed between the heads for yieldably supporting one of the members in engagement with the adjacent member.

2. A coupling comprising mating members normally extending in the same longitudinal plane, one of said members being provided with a socket and the other with a spherical head adapted to enter the socket, a locking collar slidably mounted on the head carrying member and adapted to engage the end of the adjacent member, and means for yieldably holding the collar in contact with said member.

3. A coupling comprising mating members normally extending in the same longitudinal plane one of which is provided with a socket and the other with a spherical head adapted to enter the socket, a locking collar slidably mounted on the head carrying member and provided with a flange adapted to embrace the end of the adjacent member, and a spring bearing against said collar.

4. A coupling comprising mating members normally extending in the same longitudinal plane, one of said members being provided with a socket and the other with a spherical head adapted to engage said socket, there being an aperture formed in the wall of the socket and opening through one end of said member, a locking collar carried by the head and adapted to engage the slotted end of the socket member, and means for yieldably clamping the collar in engagement with said member.

5. A coupling comprising mating members, a locking collar slidably mounted on one member and provided with a transverse perforated diaphragm defining a flange for engagement with the adjacent member, a spring engaging head spaced from the collar, and a spring interposed between the head and collar.

6. A coupling comprising a pair of mating members one of which is provided with a socket and the adjacent member with a spherical head having a reduced shank terminating in an attaching loop, a locking collar slidably mounted for longitudinal movement on the shank and provided with a perforated diaphragm defining oppositely disposed flanges one of which engages the adjacent mating member, a spring engaging head rigidly secured to the shank and spaced from the collar, and a spring interposed between said head and one of the flanges on the locking collar.

In testimony that I claim the foregoing as my own, I have hereto affixed my signature in the presence of two witnesses.

GEORGE BACH.

Witnesses:
   D. V. BOWMAN,
   RUFUS JIRSA.